US007210879B2

(12) United States Patent
Bai et al.

(10) Patent No.: US 7,210,879 B2
(45) Date of Patent: May 1, 2007

(54) UNIVERSAL HOLDING FRAME FOR CERTAIN DRILL ACCESSORIES

(76) Inventors: Li Kun Bai, 90 Englehard Dr. Aurora, Ontario (CA) LAG 3V2; Li Lin Bai, 90 Englehard Dr. Aurora, Ontario (CA) LAG 3V2

( * ) Notice: Subject to any disclaimer, the term of this patent is extended or adjusted under 35 U.S.C. 154(b) by 0 days.

(21) Appl. No.: 11/348,226

(22) Filed: Feb. 7, 2006

(65) Prior Publication Data

US 2006/0182505 A1 Aug. 17, 2006

(51) Int. Cl.
*B23B 39/20* (2006.01)
*B23B 45/00* (2006.01)

(52) U.S. Cl. ........................ 408/35; 408/113; 408/117; 483/30; 81/177.4; 81/490; 81/438; 227/135

(58) Field of Classification Search .................. 408/35, 408/95, 97, 110, 112, 113, 117; 483/30, 483/34, 35; 81/177.4, 490, 433–435, 437–439; 227/135–137
See application file for complete search history.

(56) References Cited

U.S. PATENT DOCUMENTS 1,471,137 A * 10/1923 Bowman .................... 408/112
2,360,942 A * 10/1944 Ellerstein .................... 408/112
2,389,314 A * 11/1945 Imhof et al. ................ 408/112
2,679,770 A * 6/1954 Carter et al. ................ 173/214
2,837,939 A * 6/1958 Leitner et al. .............. 408/110
2,909,085 A * 10/1959 Jepson ........................ 408/112
3,464,295 A * 9/1969 Gallion ....................... 408/112
3,550,481 A * 12/1970 Jensen .................... 408/239 R
3,746,460 A * 7/1973 Lipe ........................... 408/112
3,833,313 A * 9/1974 Gallion ........................ 408/112
4,072,440 A * 2/1978 Glover ......................... 408/112
4,179,231 A * 12/1979 Hadden ....................... 408/112
4,279,552 A * 7/1981 Epstein ........................ 408/112
4,367,837 A * 1/1983 Manino ....................... 227/136
4,653,356 A * 3/1987 Golden ...................... 81/57.14
4,836,720 A * 6/1989 Hadden ....................... 408/112
4,893,529 A * 1/1990 Lin ............................ 81/177.4
4,936,169 A * 6/1990 Parsons ..................... 81/57.37
5,022,131 A * 6/1991 Hobbs ........................... 29/40
5,207,127 A * 5/1993 Nick ............................... 81/54
5,346,453 A * 9/1994 Rivera-Bottzeck ............. 483/1
5,419,663 A * 5/1995 Psomas ......................... 408/67
5,584,221 A * 12/1996 Petrantoni ...................... 81/434
6,007,277 A * 12/1999 Olson et al. .................. 408/35
6,134,995 A * 10/2000 Shiao ............................ 81/439
6,247,879 B1 * 6/2001 Costa ........................... 408/112
6,813,977 B2 * 11/2004 Goodhue et al. ............. 81/433
7,000,509 B2 * 2/2006 Shiao ............................ 81/490
2004/0069099 A1 * 4/2004 Bai .............................. 81/490

FOREIGN PATENT DOCUMENTS

DE 4332294 A1 * 2/1994
DE 19737892 A1 * 5/1998
EP 255120 A1 * 2/1988

* cited by examiner

*Primary Examiner*—Monica Carter
*Assistant Examiner*—Michael W. Talbot

(57) ABSTRACT

A universal holding frame provides convenience and safety for certain drill accessories which all have an elongate drivable shaft and a mounted storage barrel. The universal holding frame maintains the mounted storage barrel against rotation with the shaft of the drill accessory. It can contract and extend and be able to fit almost all drills.

7 Claims, 7 Drawing Sheets

Enlarged A section

UNIVERSAL HOLDING FRAME FOR CERTAIN DRILL ACCESSORIES

FIELD OF THE INVENTION

The invention relates to a tool providing enhanced convenience and safety to certain drill accessories that all have an elongate drive shaft and a mounted rotatable storage barrel. This tool is designed to maintain the storage barrel stationary when the drive shaft is rotating, and it allows the storage barrel to be rotated by hand. The tool can reduce its touching ring's inner diameter and also can change its length making it fit different drills.

TECHNICAL BACKGROUND

For certain drill accessories, such as U.S. Pat. Ser. No. 10/680,146, titled drill accessory, they all have a rotatable storage barrel mounted on an elongate drive shaft to provide a storage area for other bits. In FIG. 1, 1 is the shaft, 2 is the storage barrel.

Because each bit is in a different shape, different weight, and usually there is an empty reserved recess on the storage barrel 2 for the bit that is being positioned on the shaft 1 and is being used, the barrel 2 is not balanced. Because of the friction, the storage barrel 2 has the trend to rotate with the shaft 1 when the shaft 1 is rotating. Once the storage barrel 2 rotates, the tool 10 and the drill 6 (in FIG. 1) will be instable. We need a way to make the barrel 2 stationary when the drive shaft 1 is rotating. One way is to use a hand to hold the barrel 2. This way always requires a hand available, not the best solution. Another solution mentioned in the patent application titled drill accessory, Ser. No. 10/680,146, is inserting a U shape spring between the storage barrel 2 and the drill body 6. This solution has some drawbacks: first, it's very hard for a U shape spring to fit all drills properly. Secondly, a U shape spring protrudes from a drill chuck, not safe and attractive. This invention provides a better solution.

SUMMARY OF THE INVENTION

A universal holding frame according to the present invention comprises one or more elastic rod(s) being rigidly attached to the storage barrel of a certain drill accessory that has a rotatable storage barrel mounted on an elongate drive shaft on one end. The universal holding frame further includes a touching ring being rigidly attached to the elastic rod(s) on the other end. When the certain drill accessory is attached to a drill, the elastic rod(s) is/are compressed; the touching ring is pushed and positioned by the force of the elastic rod(s) on the drill body. This friction from the touching ring and the drill body maintains the storage barrel of the certain drill accessory against rotation with the shaft. The touching ring is perpendicular to the centerline of the drill chuck. The perpendicular position makes the touching ring easily being rotated on the drill body by hand and the operation of the drill chuck won't be interfered with by the touching ring.

According to an aspect of the invention, the touching ring can hold a releasable bushing ring to make its internal diameter smaller to fit shorter or smaller drill chucks or drill bodies.

According to a further aspect of the invention, the universal holding frame can change its length by connecting an extending ring to its touching ring making it fit longer drill chucks or drill bodies.

According to yet a further aspect of the invention, the extending ring can hold a releasable bushing ring making the universal holding frame fit smaller and longer drill chucks or drill bodies.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
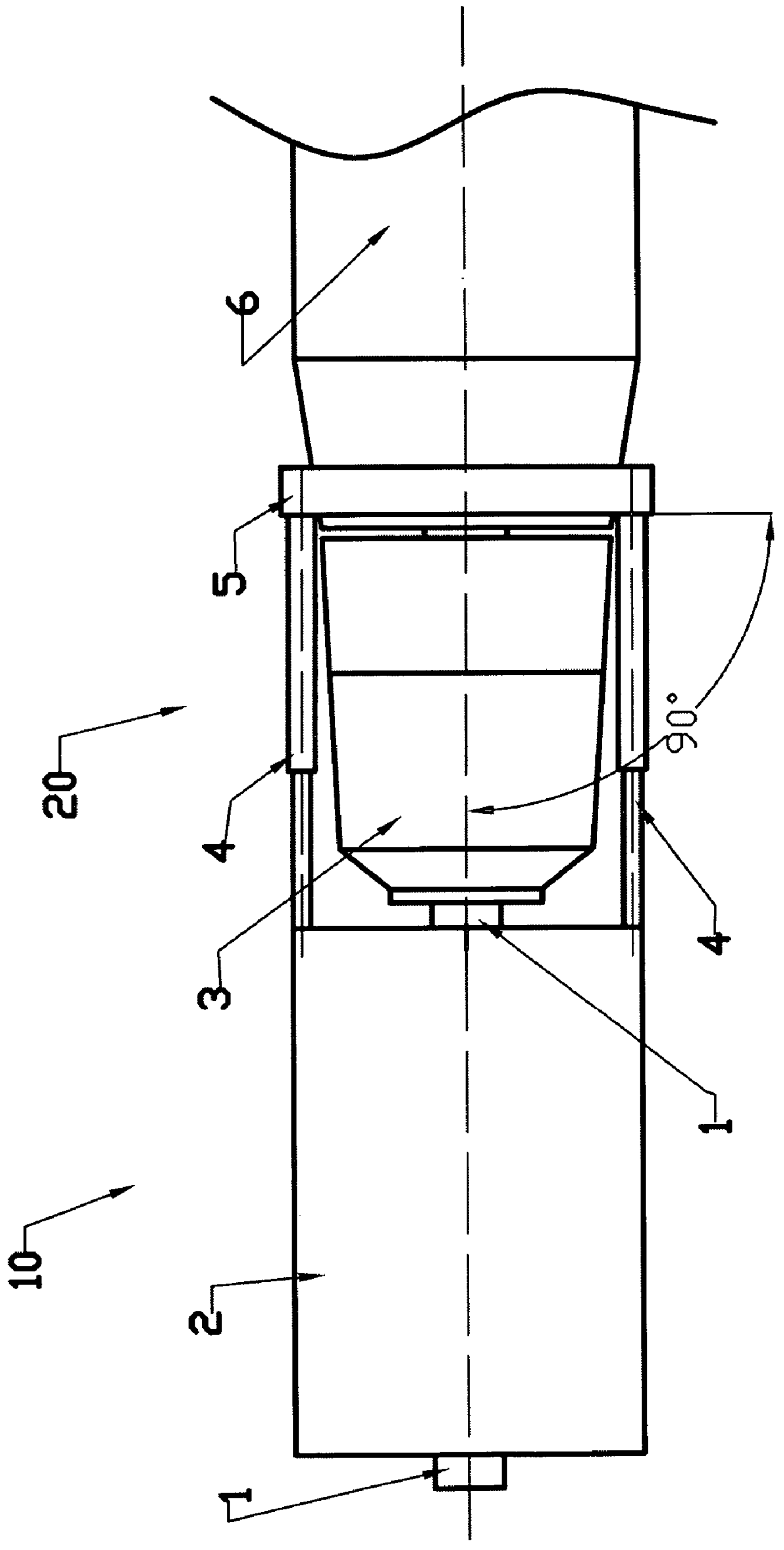
FIG. 1 is a side view of the holding frame with its drill accessory being attached to a drill. The elastic rods are compressed.
Figure 2:
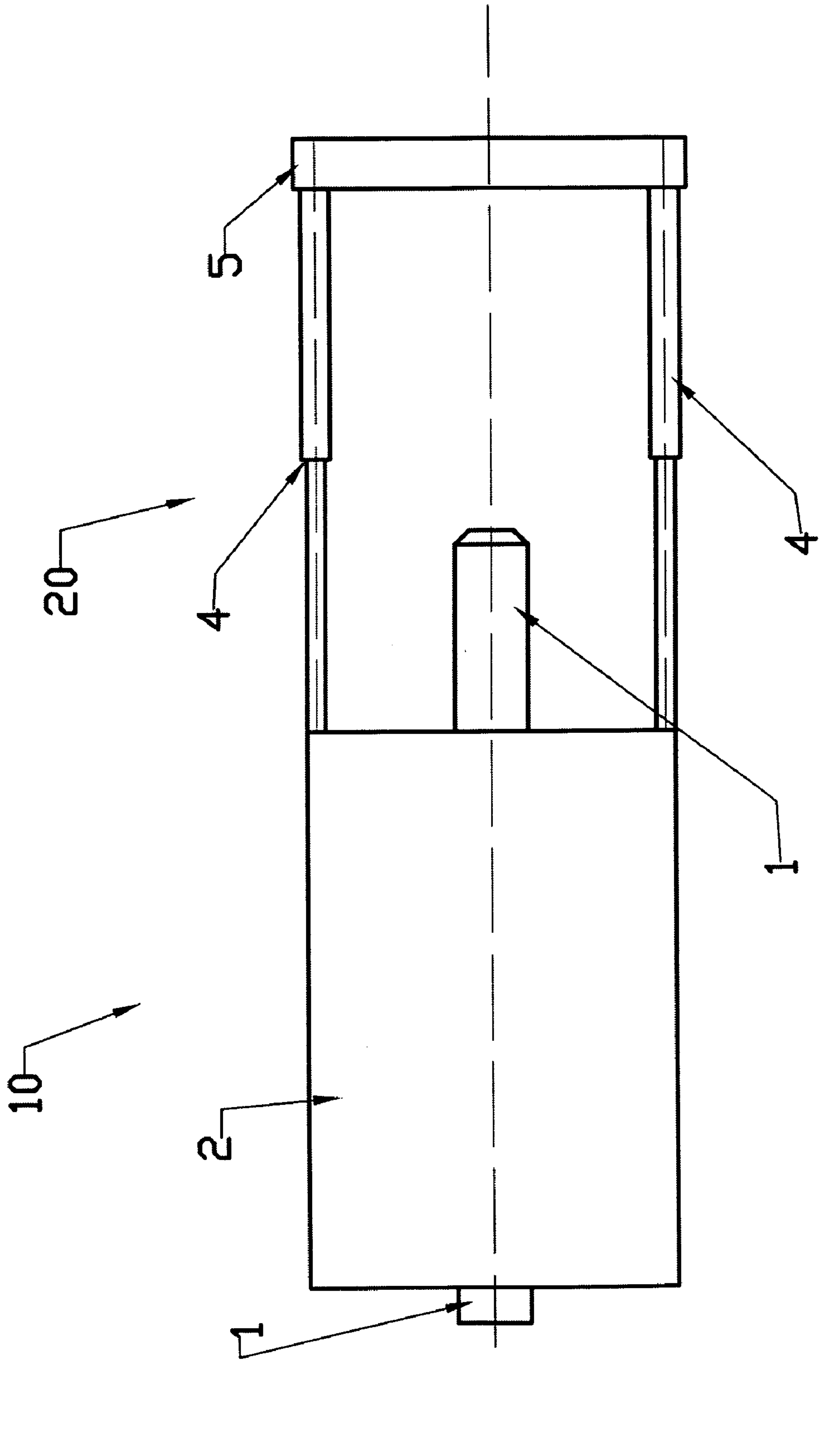
FIG. 2 is a top view of the holding frame with its drill accessory.

See FIG. 1, there is a drill accessory 10, a universal holding frame 20 comprising two elastic rods 4 and a touching ring 5. The elastic rods 4 are rigidly attached to the storage barrel 2 on one end and rigidly attached with the touching ring 5 at the other end. The elastic rods 4 are parallel with the centerline of the chuck 3. The elastic rods 4 are compressed when the drill accessory 10 is attached to a drill chuck 3 and the touching ring 5 is pushed against the drill body 6 and positioned at the drill body 6 by the elastic rods 4. The friction between the touching ring 5 and the drill body 6 will keep the storage barrel 2 from rotating with the shaft 1.

The touching ring 5 is perpendicular to the centerline of the chuck 3, See FIG. 1. This perpendicular position is maintained even though the touching ring 5 is pushed and positioned on an irregular drill body like some corded drills. The perpendicular position will make sure that the touching ring 5 won't interfere with the operation of the chuck 3 and it can be rotated by hand easily.

To search for a reserved bit on the storage barrel 2, a user just needs to overcome the friction between the touching ring 5 and the drill body 6 and rotate the storage barrel 2. This will provide the convenience of the reserved bits readily available.

The elastic rods 4 should be able to provide the elastic force to keep the touching ring 5 in the proper position, and leave enough room for hands to tighten and loosen the drill chuck 3. At least one elastic rod is needed. Having 2 elastic rods is preferred, as in FIG. 1. These 2 elastic rods are fixed on the endpoints of a diameter of the touching ring. The touching ring gets a balanced 2-point support.

Drill bodies vary in diameter and shape; drill chucks also vary in length and diameter. An elastic rod has a maximum and minimum working length. If the elastic rods 4 are at their maximum length, and the touching ring 5 hasn't yet established a proper contact that creates the needed friction with a drill body, then the holding frame 20 won't be able to maintain the storage barrel 2 stationary. If the elastic rods 4 have been compressed to their minimum length, and the shaft 1 hasn't yet been held tightly and securely by the chuck 3, the drill accessory 10 won't be able to be used securely. In order to have one holding frame 20 fit many drills, the inner diameter of the touching ring 5 needs to be able to become smaller and the holding frame 10 should be able to change its length.

Figure 3:
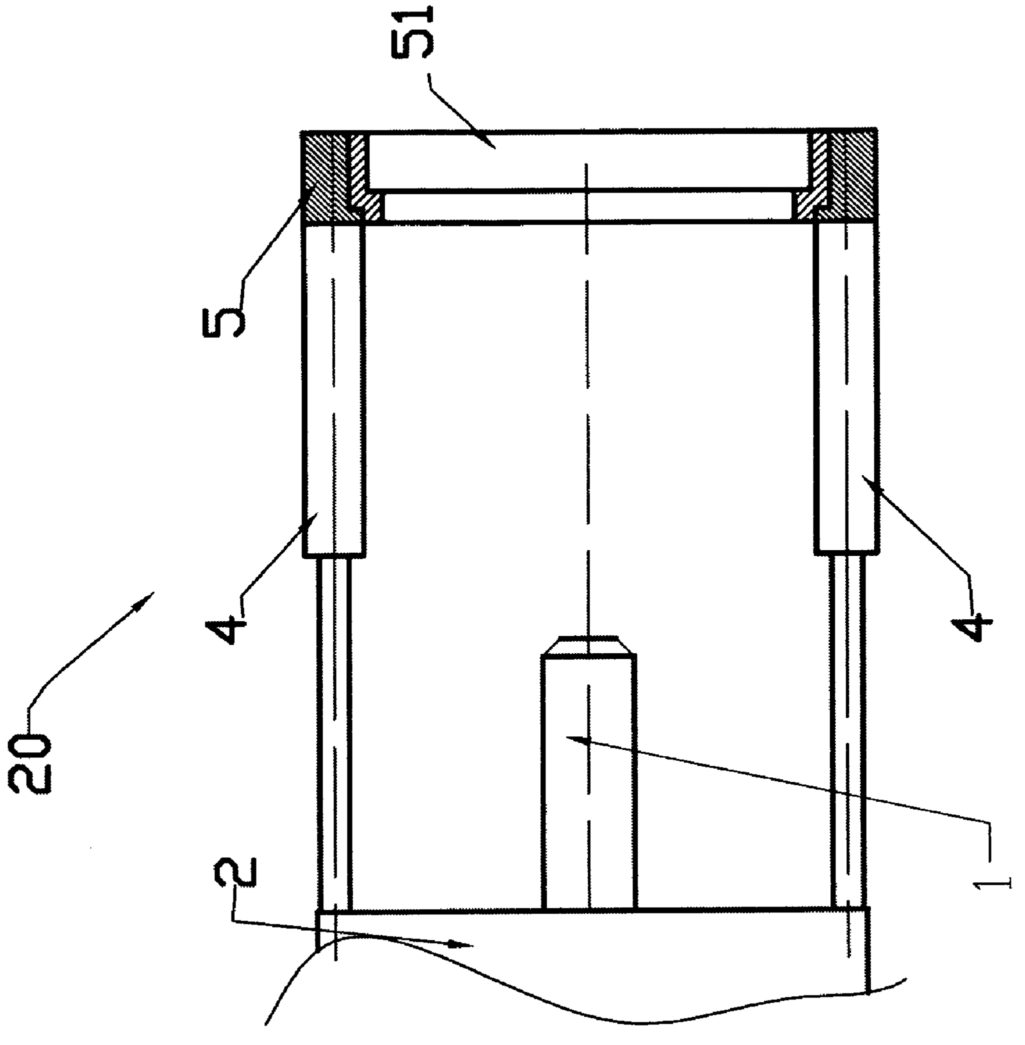
FIG. 3 is a sectional view of a bushing ring inside the touching ring.
Figure 4:
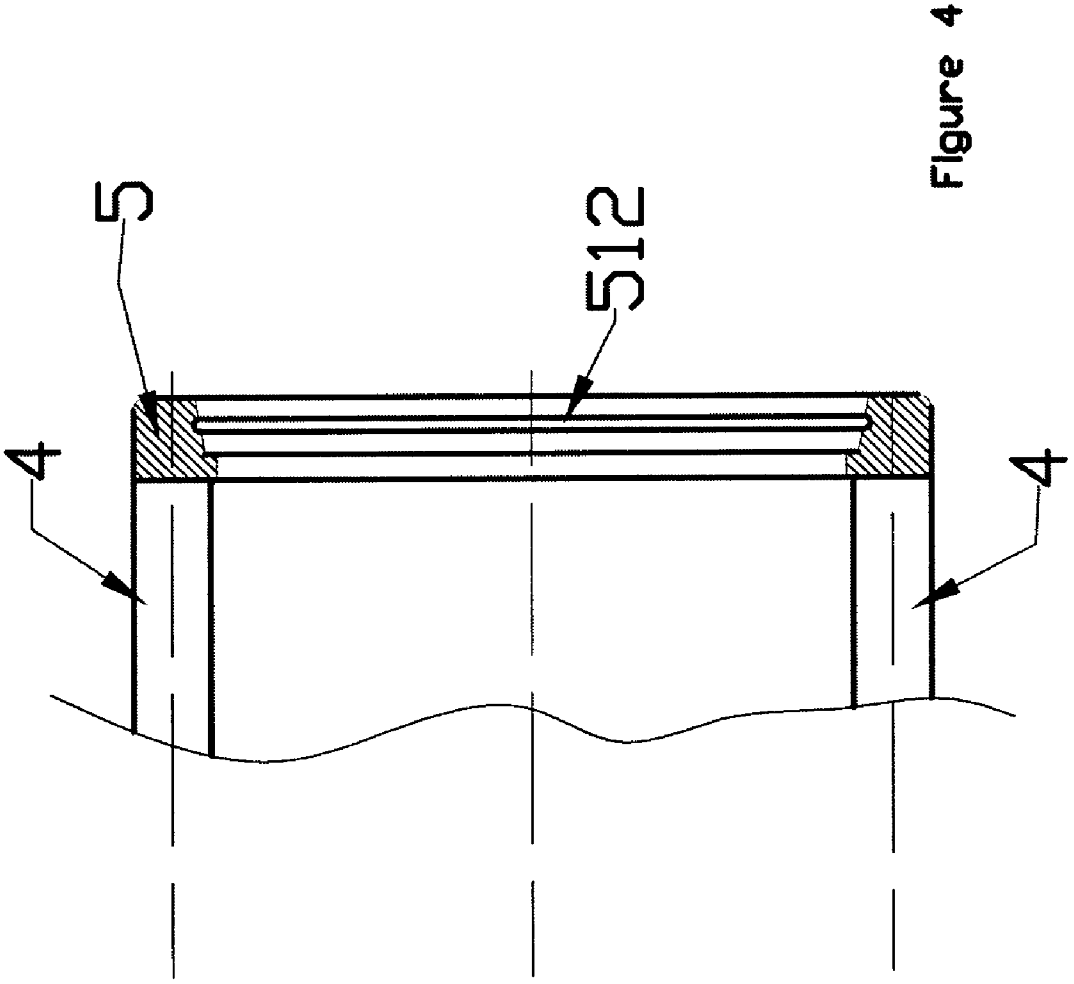
FIG. 4 is a sectional view of the round groove inside the touching ring.
Figure 5:
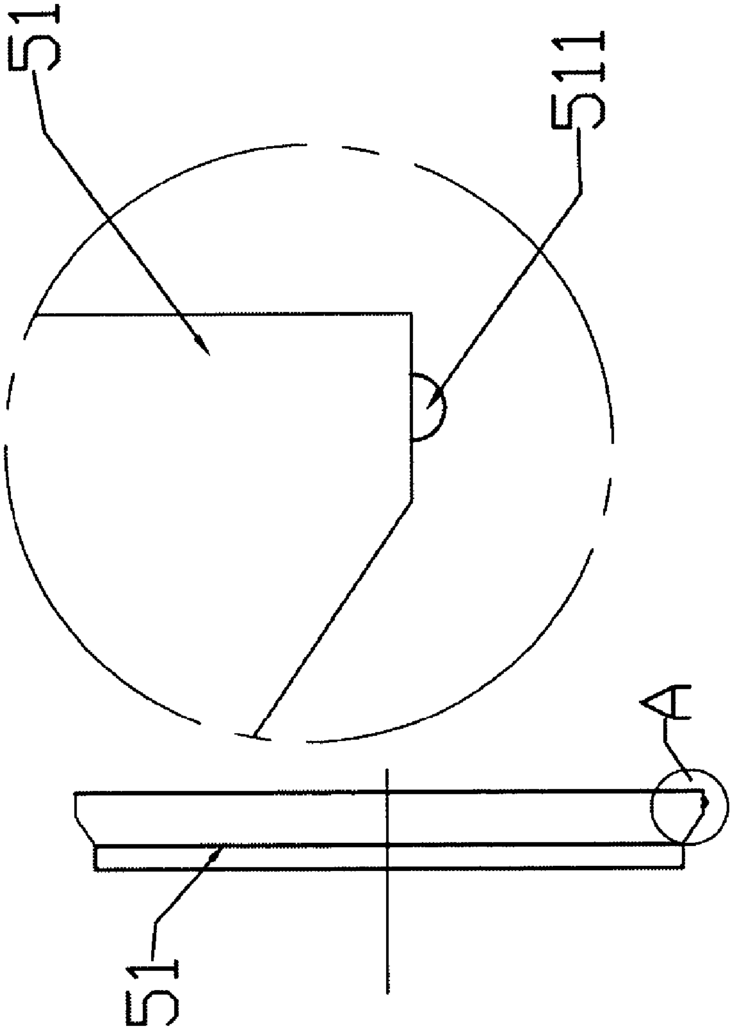
FIG. 5 is a top view of a bushing ring and its enlarged semi-spheres.

In FIG. 3, a bushing ring 51 is inserted into the touching ring 5 to reduce its internal diameter, making it suitable for smaller drill body 6 or shorter drill chuck 3. The bushing ring 51 is flexible; it can be squeezed into the touching ring 5 and be held there. To secure the bushing ring 51, some convex semi-spheres 511 on the bushing ring 51 are pushed into the round groove 512 inside the touching ring 5. See FIGS. 4 and 5. The bushing ring 51 is releasable. It can be released from the touching ring 5 by pushing it out. A number of bushing rings 51 can be made with different internal diameters for different drills.

Figure 6:
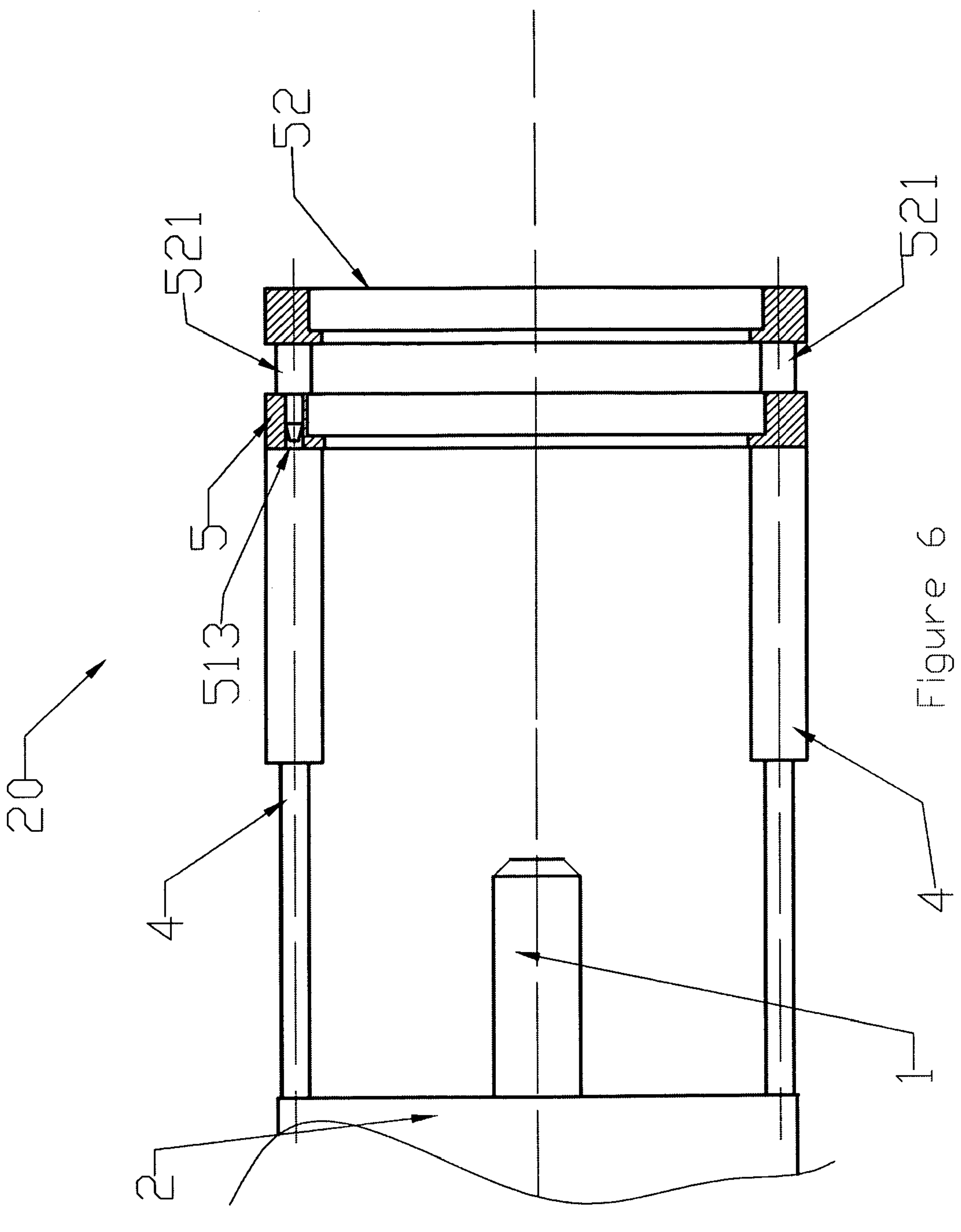
FIG. 6 is a sectional view of an extending ring attached to the touching ring.

In FIG. 6, an extending ring 52 is attached to the touching ring 5 to make the holding frame 20 longer. The pins 521 on the extending ring 52 are inserted into the holes 513 on the touching ring 5 connecting the extending ring 52 to the touching ring 5. The extending ring 52 also can be connected to another extending ring so that more than one extending ring can be attached to the holding frame 20. The extending rings can be made in different heights for different drill bodies. The extending ring 52 is also releasable. It can be released from the touching ring 5 by pulling the pins 521 out from the holes 513.

Figure 7:
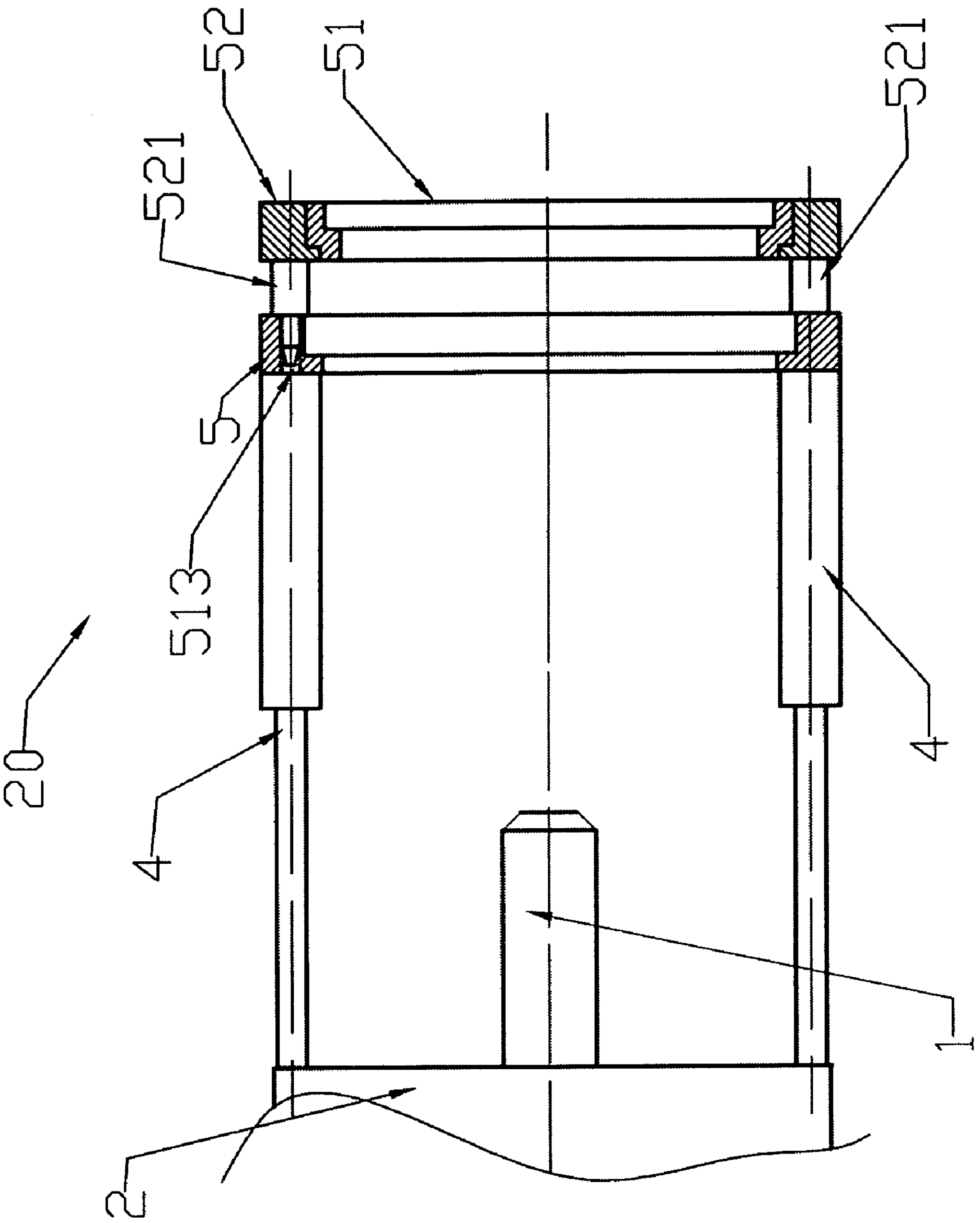
FIG. 7 is a top sectional view of a bushing ring inside an extending ring.

In FIG. 7, the extending ring 52 has a bushing ring 51 being inserted into it making its internal diameter smaller. This makes the holding frame 20 fit certain drills, like smaller and longer ones.

A bushing ring 51 and/or an extending ring 52 make the holding frame fit more drills.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A tool for assisting certain drill accessories, that all have an elongate drive shaft and a mounted rotatable storage barrel comprising one or more elastic rod(s) being rigidly attached with said storage barrel on one end, said tool further including a touching ring being rigidly attached to the other end of said elastic rod(s), said touching ring being pushed and positioned on a drill body by said elastic rod(s) and said storage barrel being maintained against rotation along with said drive shaft by the friction between said touching ring and said drill body when said certain drill accessories are attached to a drill and said elastic rod(s) is/are compressed.

2. A tool as claimed in claim 1 wherein said touching ring is perpendicular to the centerline of a drill chuck when it is pushed by said elastic rods and positioned on a drill body.

3. A tool as claimed in claim 2 wherein said touching ring can hold a releasable bushing ring to make its internal diameter smaller.

4. A tool as claimed in claim 3 wherein said touching ring can connect to a releasable extending ring to make said tool longer.

5. A tool as claimed in claim 4 wherein said releasable extending ring can hold a bushing ring to make its internal diameter smaller.

6. A tool as claimed in claim 5 wherein said releasable extending ring can connect to another releasable extending ring to make it longer.

7. A tool as claimed in claim 6 wherein said elastic rod(s) is/are parallel with the centerline of a drill chuck when said certain drill accessories are attached to a drill.

* * * * *